US008217582B2

(12) United States Patent
Yamauchi et al.

(10) Patent No.: US 8,217,582 B2
(45) Date of Patent: Jul. 10, 2012

(54) LIGHT SOURCE DEVICE, IMAGE DISPLAY APPARATUS, AND METHOD OF GENERATING TIME-DIVISION COLOR-SEPARATED LIGHT

(75) Inventors: Kentaro Yamauchi, Ashiya (JP);
Takeshi Takezawa, Matsumoto (JP);
Tetsuo Terashima, Chino (JP);
Shigeyasu Soma, Muroran (JP)

(73) Assignee: Seiko Epson Corporation, Tokyo (JP)

( * ) Notice: Subject to any disclaimer, the term of this patent is extended or adjusted under 35 U.S.C. 154(b) by 449 days.

(21) Appl. No.: 12/640,356

(22) Filed: Dec. 17, 2009

(65) Prior Publication Data

US 2010/0148682 A1 Jun. 17, 2010

(30) Foreign Application Priority Data

Dec. 17, 2008 (JP) ................................. 2008-321398

(51) Int. Cl.
*H05B 37/02* (2006.01)

(52) U.S. Cl. ................ 315/209 T; 315/209 R; 315/291; 353/85

(58) Field of Classification Search .............. 315/209 R, 315/209 T, 224–226, 246, 247, 291, 297, 315/307, 308, 360; 353/85
See application file for complete search history.

(56) References Cited

U.S. PATENT DOCUMENTS 5,917,558 A * 6/1999 Stanton .......................... 348/743
6,815,907 B2 11/2004 Riederer
7,365,497 B2 * 4/2008 Fukuda et al. ............. 315/209 T
7,909,473 B2 * 3/2011 Deppe ............................. 353/85
2007/0171313 A1 7/2007 Haraguchi et al.
2008/0137041 A1 6/2008 Okamoto et al.

FOREIGN PATENT DOCUMENTS

| JP | 8-505031 A | 5/1996 |
| JP | 2003-162001 A | 6/2003 |
| JP | 2006-515077 A | 5/2006 |
| JP | 2007-187750 A | 7/2007 |
| JP | 2008-146837 A | 6/2008 |
| WO | WO-95/11572 | 4/1995 |
| WO | WO-2004/098182 A1 | 11/2004 |

* cited by examiner

*Primary Examiner* — Jacob Y Choi
*Assistant Examiner* — Jimmy Vu
(74) *Attorney, Agent, or Firm* — AdvantEdge Law Group, LLC

(57) ABSTRACT

A light source device includes: a discharge lamp provided with two electrodes; a discharge lamp lighting section adapted to light the discharge lamp by supplying the discharge lamp with electrical power while alternately switching a polarity of one of the electrodes of the discharge lamp with respect to the other of the electrodes; and a time-division color separation section adapted to receive light emitted from the discharge lamp in a lighted state and sequentially emit light beams with colors different from each other, wherein the discharge lamp lighting section switches the polarity in sync with a change in the color of the light beam emitted from the time-division color separation section, and provides, as retentive periods in which a duty ratio, which is a ratio of a positive polarity period with the polarity kept positive to a period of the polarity switching, is retained at a constant value over a predetermined period of time, a first retentive period and a second retentive period different in the duty ratio from the first retentive period, thereby modulating the duty ratio.

15 Claims, 14 Drawing Sheets

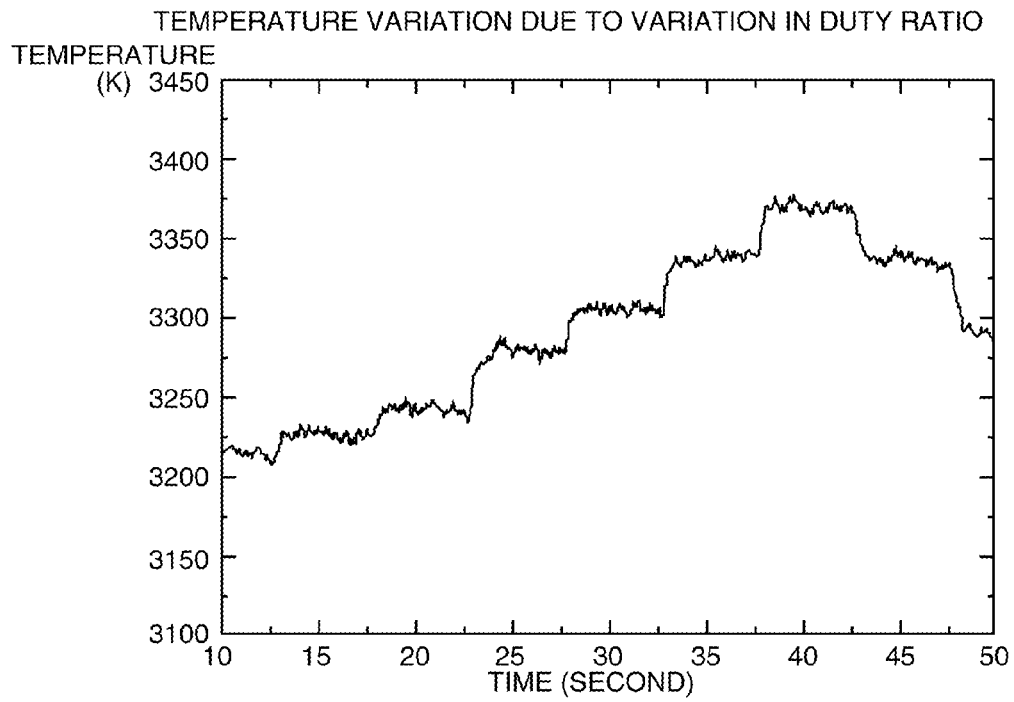
FIG. 8A
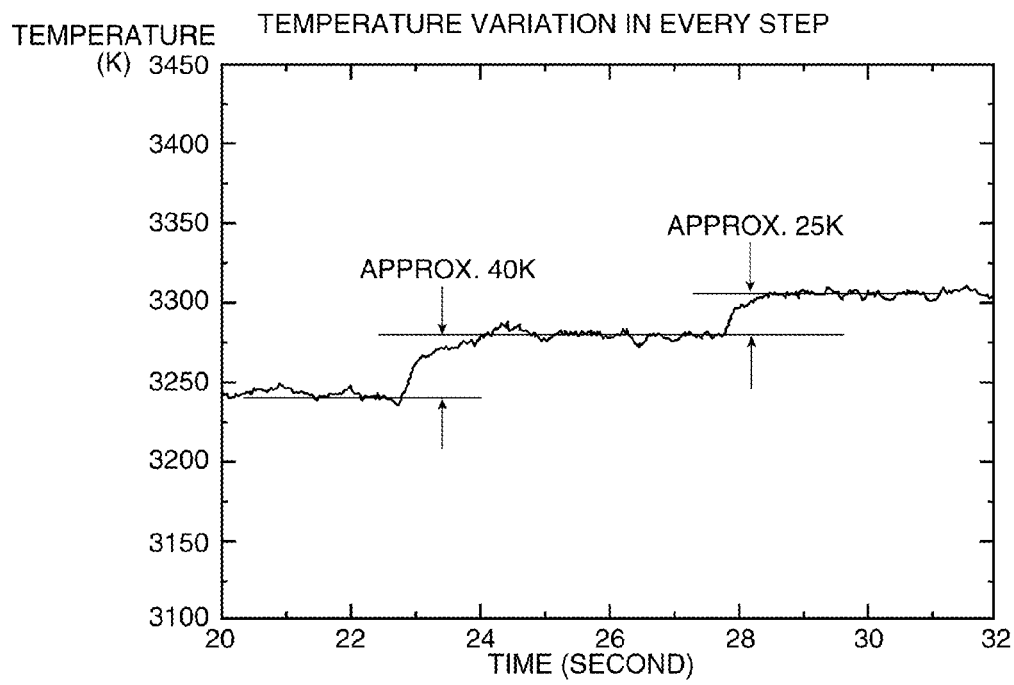
FIG. 8B
FIG. 8

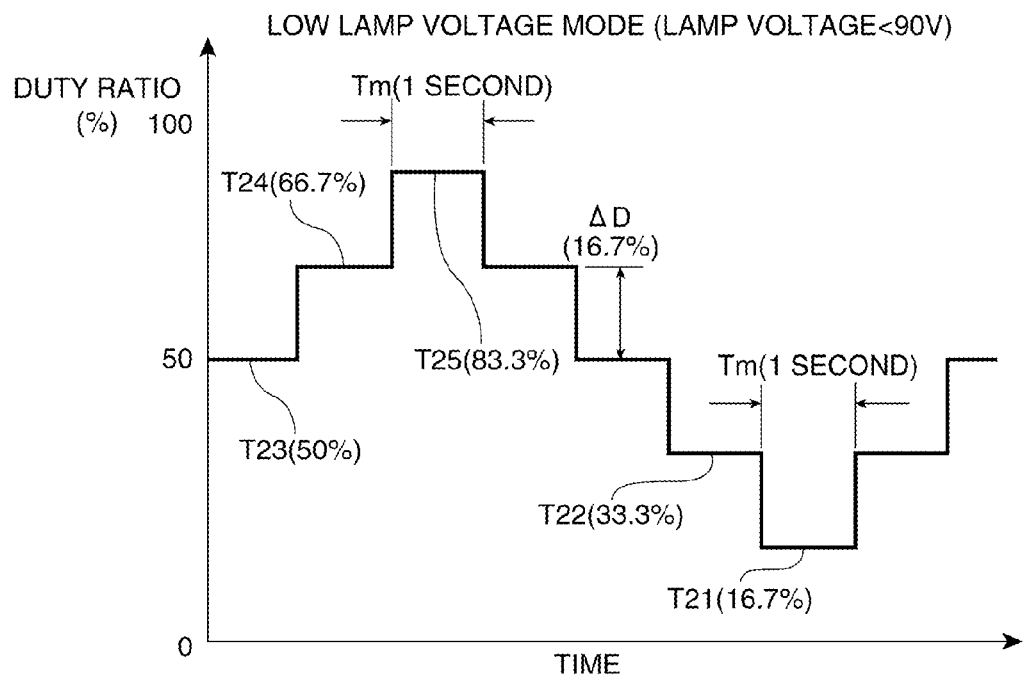
FIG. 11A
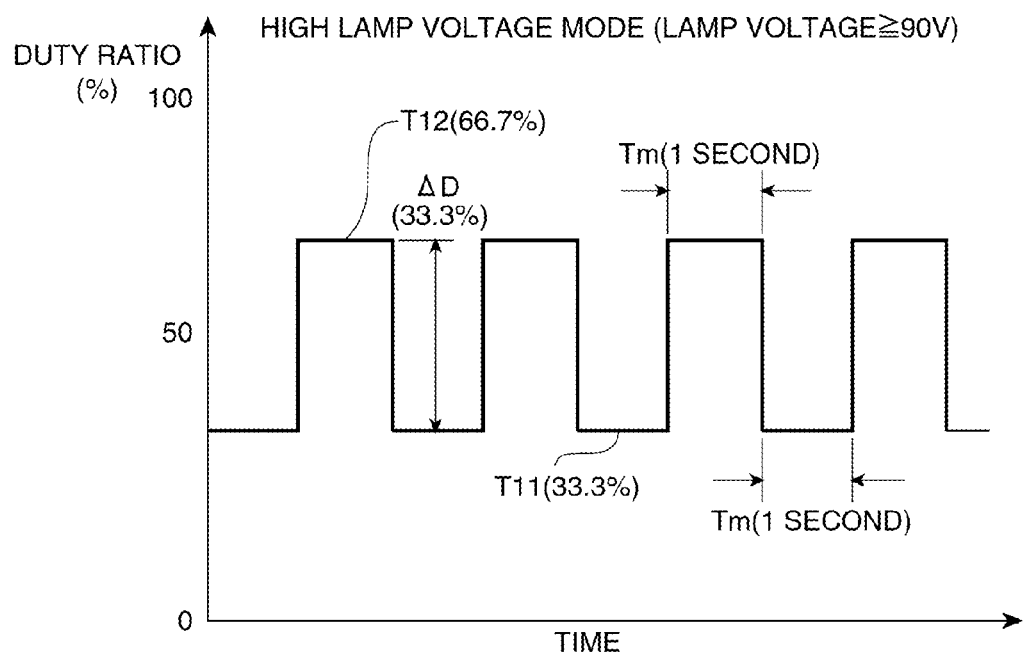
FIG. 11B
FIG. 11

LIGHT SOURCE DEVICE, IMAGE DISPLAY APPARATUS, AND METHOD OF GENERATING TIME-DIVISION COLOR-SEPARATED LIGHT

BACKGROUND

1. Technical Field

The present invention relates to a driving technology of a discharge lamp emitting light caused by discharge between the electrodes.

2. Related Art

In the projectors using a Digital Micromirror Device (DMD, a trademark owned by Texas Instruments) as a spatial modulation element, it is performed that the light from a discharge lamp such as a metal halide lamp for emitting white light is temporally divided into colored light beams of red, blue, and green, for example, using a color wheel. In the case of driving the discharge lamp with an alternating-current lamp drive current, if the conversion of the polarity of the lamp drive current is performed outside the blanking period of the color wheel, the brightness of a screen might be varied due to the variation in the light output at the moment of the polarity conversion. In order for solving the problem described above, in JP-A-2003-162001, it is proposed to convert the polarity of the lamp drive current in the blanking period in which a segment boundary in a color filter traverses the light beam.

However, in the case of driving the discharge lamp using the method proposed in JP-A-2003-162001, the temperature distribution inside the discharge lamp becomes stationary, and thus an electrode material might be stacked locally on a shaft of the electrode and so on, thereby growing an acicular crystal of the electrode material. In this case, deterioration of the discharge lamp might develop rapidly due to abnormal discharge from the acicular crystal to the inner wall and so on, thereby shortening the life of the discharge lamp.

SUMMARY

An advantage of some aspects of the invention is to make it possible to use the discharge lamp for a longer period of time, thereby solving the problem in the related art described above.

The invention can be put into practice as the following embodiments or aspects.

According to a first aspect of the invention, there is provided a light source device including a discharge lamp provided with two electrodes, a discharge lamp lighting section adapted to light the discharge lamp by supplying the discharge lamp with electrical power while alternately switching a polarity of one of the electrodes of the discharge lamp with respect to the other of the electrodes, and a time-division color separation section adapted to receive light emitted from the discharge lamp in a lighted state and sequentially emit light beams with colors different from each other, and the discharge lamp lighting section switches the polarity in sync with a change in the color of the light beam emitted from the time-division color separation section, and provides, as retentive periods in which a duty ratio, which is a ratio of a positive polarity period with the polarity kept positive to a period of the polarity switching, is retained at a constant value over a predetermined period of time, a first retentive period and a second retentive period different in the duty ratio from the first retentive period, thereby modulating the duty ratio.

According to this aspect of the invention, the duty ratio is modulated by providing the first and second retentive periods different in the duty ratio from each other. Since the duty ratio is retained at a constant value over the predetermined period of time in these retentive periods, the temperature distribution inside the discharge lamp can be set to be in a nonstationary state. By thus making the temperature distribution nonstationary, it is possible to prevent formation of the stationary convection conceivably causing the localized deposition of the electrode material, thus the localized deposition of the electrode material can be prevented. Therefore, formation of the acicular crystal or the like to be a cause of deterioration can be prevented, thus it becomes possible to use the discharge lamp for a longer period of time. Further, by switching the polarity in sync with the change in the color, deterioration of an image caused by the variation in the emitted light intensity due to the switching of the polarity can be prevented.

According to a second aspect of the invention, in the light source device of the first aspect of the invention, the time-division color separation section periodically emits the light beams with the colors different from each other, and the period of the polarity switching is an integral multiple of a period of the change in the color.

By arranging the period of the polarity switching to be the integral multiple of the period of the change in color, setting of the duty ratio in each of the retentive periods becomes easier even in the case in which the time interval between the changes in color is not constant.

According to a third aspect of the invention, in the light source device of one of the first and second aspects of the invention, a length of the period of the polarity switching is modified based on a deterioration state of the discharge lamp.

By modifying the length of the period of the polarity switching based on the deterioration state, it is possible to drive the discharge lamp in more appropriate conditions at the beginning of the use of the discharge lamp and after the deterioration of the discharge lamp has been advanced. Therefore, the available period of the discharge lamp can be extended.

According to a fourth aspect of the invention, in the light source device according to any one of the first through third aspects of the invention, the discharge lamp lighting section modulates the duty ration along a predetermined modulation pattern, and the modulation pattern is modified based on a deterioration state of the discharge lamp.

According also to this aspect of the invention, by modifying the modulation pattern based on the deterioration state, it is possible to drive the discharge lamp in more appropriate conditions at the beginning of the use of the discharge lamp and after the deterioration of the discharge lamp has been advanced. Therefore, the available period of the discharge lamp can be extended.

According to a fifth aspect of the invention, in the light source device of one of the third and fourth aspects of the invention, there is further provided a lamp voltage detection section adapted to detect a lamp voltage, which is a voltage between the two electrodes upon supplying the discharge lamp with predetermined electrical power, and the deterioration state of the discharge lamp is determined based on the lamp voltage.

In general, the lamp voltage rises as the deterioration of the discharge lamp progresses. Therefore, according to this aspect of the invention, it becomes possible to more easily figure out the deterioration state of the discharge lamp.

According to a sixth aspect of the invention, in the light source device according to any one of the first through fifth aspects of the invention, the discharge lamp lighting section sets electrical power to be supplied to the discharge lamp in accordance with the color of the light beam emitted form the time-division color separation section.

According to this aspect of the invention, by setting the electrical power to be supplied to the discharge lamp in accordance with the color of the light beam emitted from the time-division color separation section, it becomes easier to more appropriately set the white balance.

It should be noted that the invention can be put into practice in various forms. The invention can be put into practice in the forms such as a driving device and a driving method of a discharge lamp, a light source device using a discharge lamp and a control method therefor, a light generation method for temporally generating light beams with colors different from each other using a discharge lamp, or an image display apparatus using such devices or methods.

BRIEF DESCRIPTION OF THE DRAWINGS

The invention will be described with reference to the accompanying drawings, wherein like numbers reference like elements.

FIGS. 8A and 8B are graphs showing the temperature variation of the electrode due to the modulation of the duty ratio.

FIGS. 11A and 11B are explanatory diagrams showing an example of a duty ratio modulation pattern according to a second embodiment.

DESCRIPTION OF EXEMPLARY EMBODIMENTS

A1. Configuration of Projector

Figure 1:
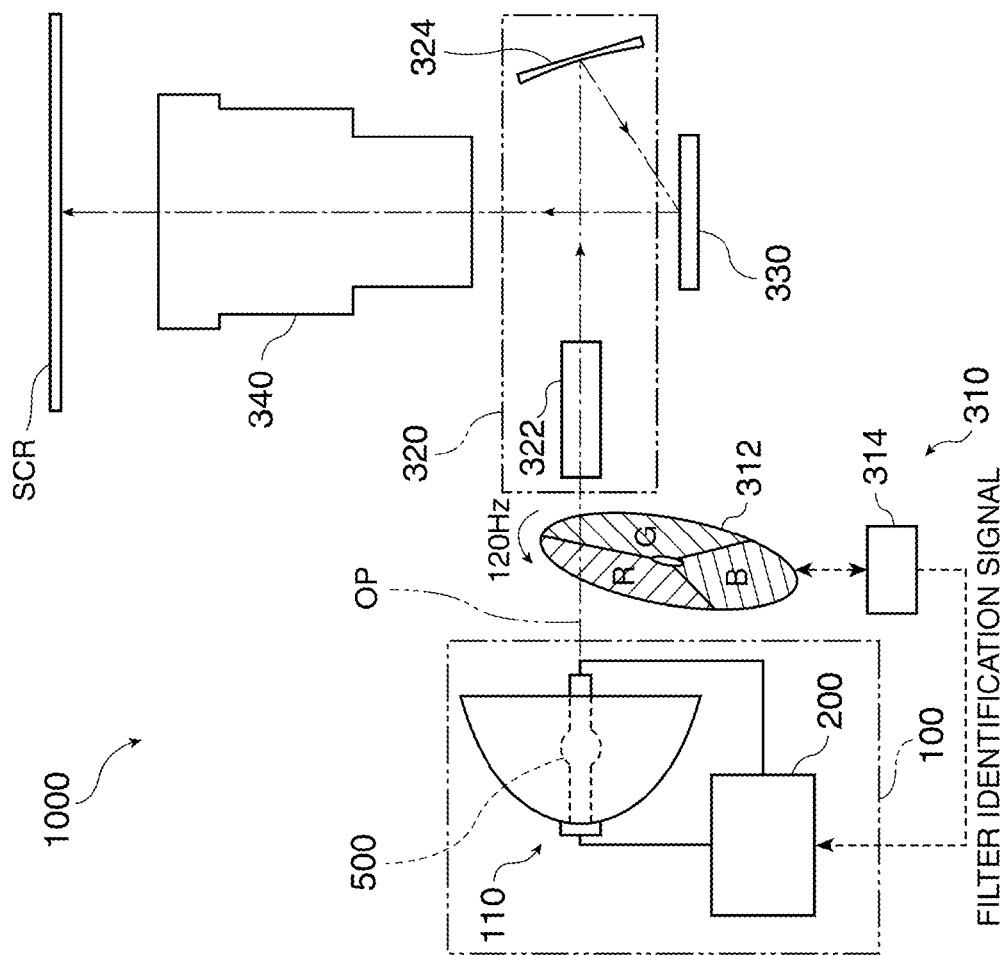
FIG. 1 is a schematic configuration diagram of a projector to which a first embodiment of the invention is applied.

FIG. 1 is a schematic configuration diagram of a projector 1000 to which a first embodiment of the invention is applied. The projector 1000 is provided with a white light source device 100, a color separation device 310, an illumination optical system 320, a spatial modulation device 330, and a projection optical system 340.

The white light source device 100 has a light source unit 110 attached with a discharge lamp 500, and a discharge lamp driving device 200 for driving the discharge lamp 500. The discharge lamp 500 is supplied with electrical power by the discharge lamp driving device 200 to cause discharge, thereby emitting substantially white light. The light source unit 110 emits the light, which is emitted from the discharge lamp 500, toward the color separation device 310. It should be noted that specific configurations and specific functions of the light source unit 110 and the discharge lamp driving device 200 will be described later.

The color separation device 310 has a color wheel 312 shaped like a disk and provided with red (R), green (G), and blue (B) filters, and a color wheel control section 314. The color wheel 312 is rotated at a predetermined rotational frequency (120 Hz, in the example of FIG. 1) by a motor (not shown) controlled by the color wheel control section 314. In accordance with the rotation of the color wheel 312, the filter located on an optical path OP of an incident light to the color separation device 310 from the light source unit 110 is switched sequentially. Thus, temporally different colored light beams (time-division colored light beams) are generated from the substantially white light from the light source unit 110 correspondingly to the filter located on the optical path OP, and then the time-division colored light beams are emitted from the color separation device 310. The color wheel control section 314 also receives an output of a sensor attached to the color wheel 312 or the motor, and then identifies which one of the R, G, and B filters is located on the optical path OP. The color wheel control section 314 supplies the discharge lamp driving device 200 with a signal (a filter identification signal) representing the filter thus identified.

The illumination optical system 320 has a rod lens 322 and a concave mirror 324. The time-division colored light beams generated in the color separation device 310 uniformly illuminates the spatial modulation device 330 via the rod lens 322 and the concave mirror 324.

The spatial modulation device 330 spatially modulates the time-division colored light beams having entered from the illumination optical system 320, and then emits the light beams thus modulated toward the projection optical system 340. It should be noted that in the first embodiment, as the spatial modulation device 330, there is used a Digital Micromirror Device (DMD, the trademark owned by Texas Instruments) provided with micromirrors corresponding respectively to the pixels, and for switching ON/OFF the light beams reflected toward the projection optical system 340 by changing the angles of the micromirrors. It should also be noted that various modulation devices can be used as the spatial modulation device 330 providing the modulation devices are capable of spatially modulating the incident light beams to the spatial modulation device 330, and then emitting them toward the projection optical system 340. For example, magneto-optical spatial modulation device using a magneto-optical effect, and a spatial modulation device (a light valve) using liquid crystal can also be used. In this case, the positional relationship between the illumination optical system 320, the spatial modulation device 330, and the projection optical system 340 is modified accordingly.

The projection optical system 350 projects the light input thereto on the screen SCR. As described above, in the projector 1000 according to the first embodiment, the spatial modulation device 330 spatially modulates the time-division colored light beams. By thus projecting the spatially modulated time-division colored light beams on the screen SCR, a full-color image is displayed on the screen SCR.

Figure 2:
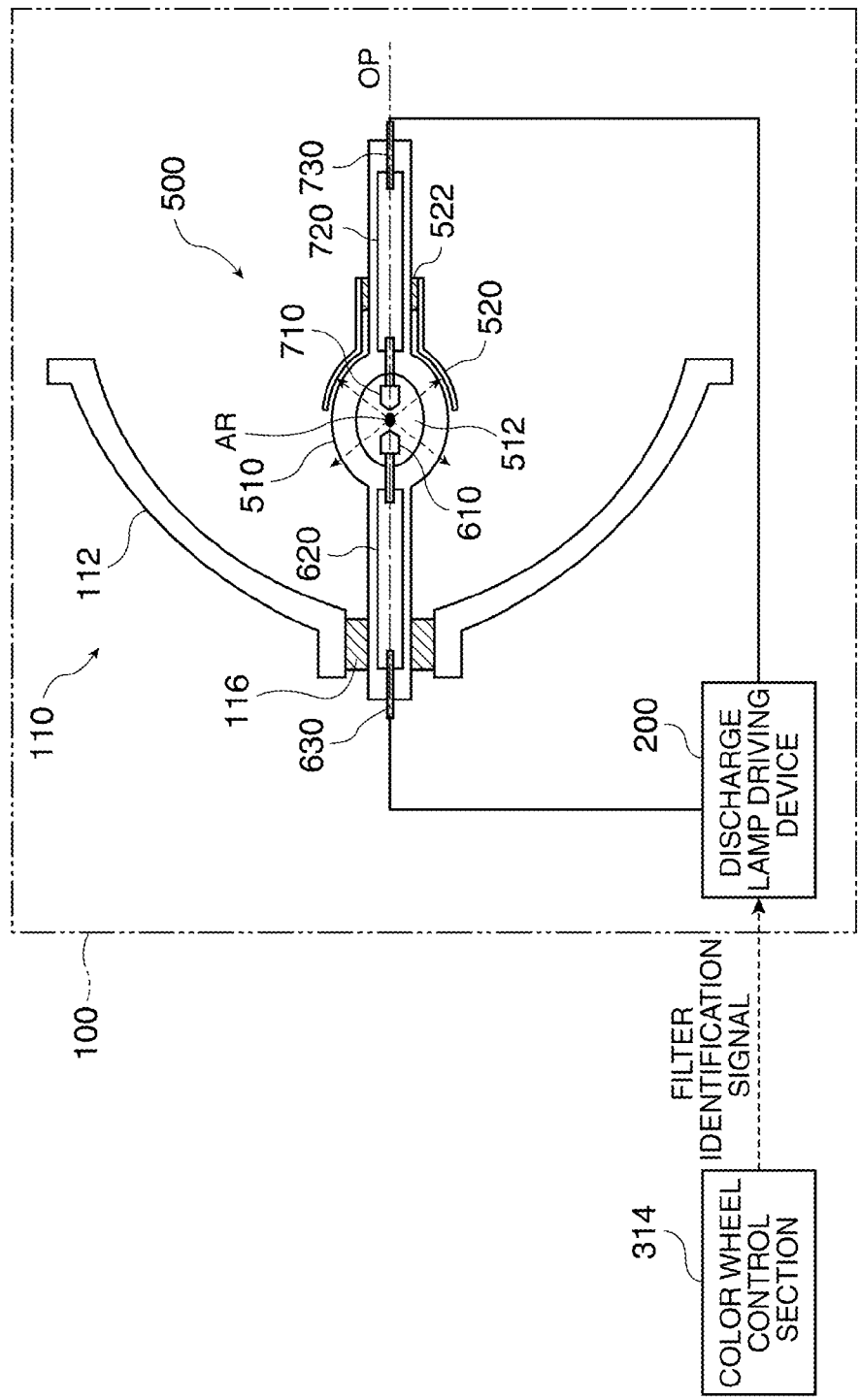
FIG. 2 is an explanatory diagram showing a configuration of a white light source device.

FIG. 2 is an explanatory diagram showing a configuration of the white light source device 100. As described above, the white light source device 100 is provided with the light source unit 110 and the discharge lamp driving device 200. The light source unit 110 is provided with the discharge lamp 500 and a primary reflecting mirror 112 having a spheroidal reflecting surface. A light emitting section of the discharge lamp 500 and an entrance end of the rod lens 322 are respectively disposed at so-called focal points of the primary reflecting mirror 112. The primary reflecting mirror 112 and the discharge lamp 500 are bonded to each other with an inorganic adhesive 116.

The discharge lamp 500 is formed by bonding a discharge lamp main body 510 and a secondary reflecting mirror 520 having a spherical reflecting surface to each other with an inorganic adhesive 522. The discharge lamp main body 510 is formed from, for example, a glass material such as quartz glass. The discharge lamp main body 510 is provided with two electrodes 610, 710 formed from a high-melting point electrode material such as tungsten, two connection members 620, 720, and two electrode terminals 630, 730. The electrodes 610, 710 are disposed so that the tip portions thereof are opposed to each other in a discharge space 512 formed at the central portion of the discharge lamp main body 510. In the discharge space 512, there is encapsulated a gas including a noble gas, mercury, a metallic halide compound, and so on as a discharge medium. The connection members 620, 720 are members for electrically connecting the electrodes 610, 710 and the electrode terminals 630, 730 to each other, respectively.

The electrode terminals 630, 730 of the discharge lamp 500 are separately connected to the discharge lamp driving device 200. In other words, the discharge lamp driving device 200 is connected to the electrode terminals 630, 730. The discharge lamp driving device 200 generates a pulsed alternating current (an alternating pulse current) to be supplied to the discharge lamp 500 based on the filter identification signal supplied from the color wheel control section 314. When the alternating pulse current is supplied to the discharge lamp 500, an arc AR occurs between the tip portions of the two electrodes 610, 710 disposed in the discharge space 512. The arc AR emits light in all directions from the point where the arc AR occurs. The secondary reflecting mirror 520 reflects the light, which is emitted toward the electrode 710, namely one of the electrodes 610, 710, toward the primary reflecting mirror 112. By thus reflecting the light, which is emitted toward the electrode 710, toward the primary reflecting mirror 112, the light emitted toward the electrode 710 can effectively be used. It should be noted that the electrode 710 on the side where the secondary reflecting mirror 520 is disposed is hereinafter referred to also as a "secondary mirror side electrode 710," and the other electrode 610 is referred to also as a "primary mirror side electrode 610."

Figure 3:
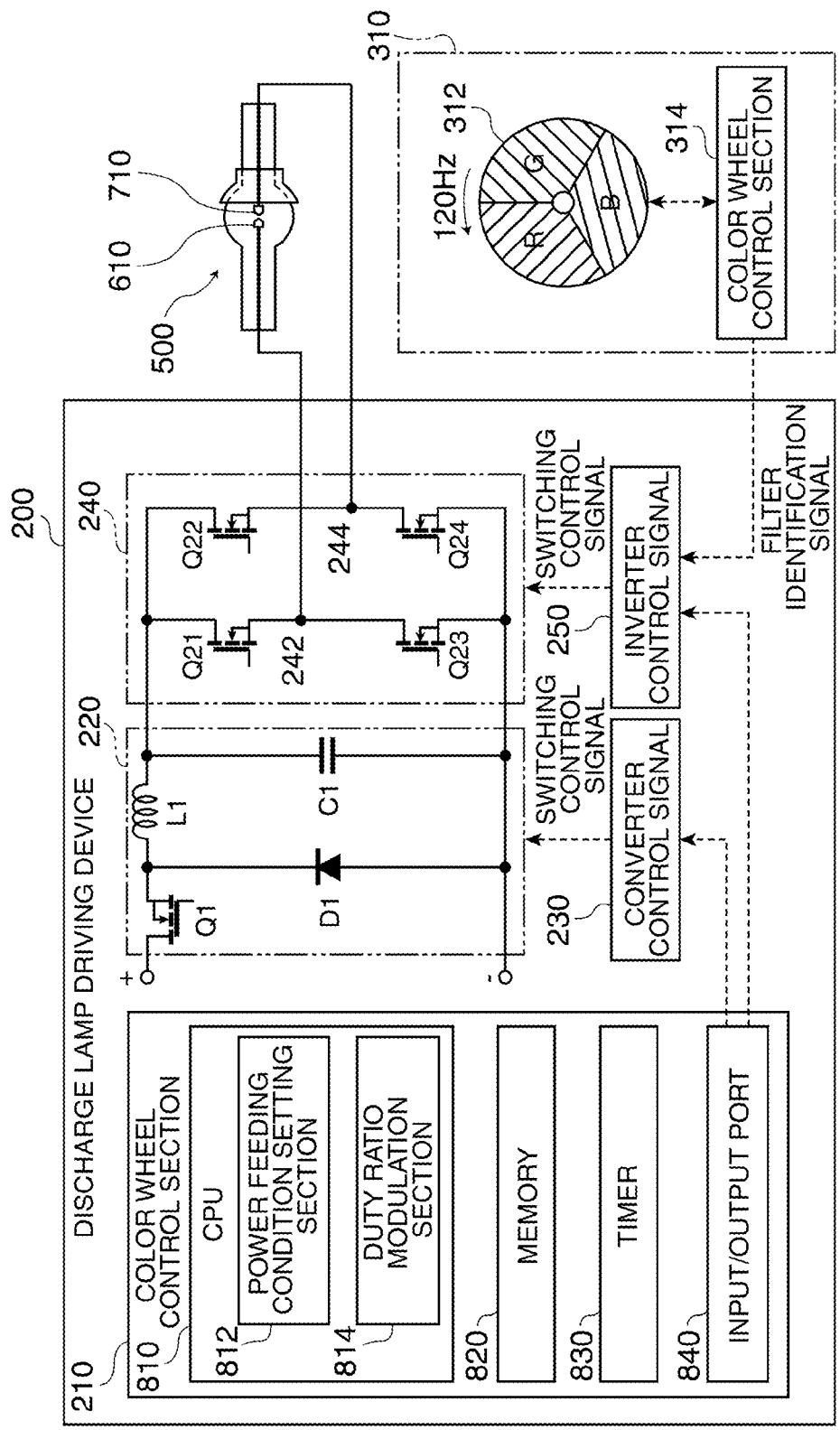
FIG. 3 is an explanatory diagram showing a schematic configuration of a discharge lamp driving device.

FIG. 3 is an explanatory diagram showing a schematic configuration of the discharge lamp driving device 200. The discharge lamp driving device 200 has a drive control section 210, a converter 220, a converter control section 230, an inverter 240, and an inverter control section 250.

The drive control section 210 is configured as a computer provided with a CPU 810, a memory 820 mainly composed of a ROM and a RAM, a timer 830, and an input/output port 840 for communicating signals with the converter control section 230 and the inverter control section 250. The CPU 810 of the drive control section 210 executes a program stored in the memory 820 based on the output of the timer 830 and the signal obtained by the input/output port 840, thereby realizing the function as a power feeding condition setting section 812 and a duty ratio modulation section 814.

The power feeding condition setting section 812 transmits control signals to the converter control section 230 and the inverter control section 250 via the input/output port 840, thereby setting the power feeding condition of the alternating pulse current to be supplied to the discharge lamp 500. Specifically, the power feeding condition setting section 812 transmits a control signal for designating the power value of the alternating pulse current to be supplied to the discharge lamp to the converter control section 230, and a control signal for designating the frequency and the duty ratio of the alternating pulse current to the inverter control section 250. The duty ratio modulation section 814 sets a duty ratio modulation pattern in the power feeding condition setting section 812 in order for modulating the alternating pulse current to be supplied to the discharge lamp 500.

The converter 220 is configured as a step-down converter (a back converter) for stepping down the high-voltage direct-current power supplied from a high-voltage power supply circuit (not shown) provided to the discharge lamp driving device 200. The converter 220 has a switching element Q1, a choke coil L1, a diode D1, and a capacitor C1. The switching element Q1 is controlled in the ON/OFF state by a switching control signal supplied from the converter control section 230. The electrical power stepped down by an ON/OFF (chopping) operation of the switching element Q1 is supplied to the inverter 240. The converter control section 230 controls the duty ratio of the ON state of the switching element Q1, thereby controlling the voltage supplied to the inverter 240 so that the discharge lamp 500 is supplied with the electrical power designated by the power feeding condition setting section 812.

The inverter 240 is a full-bridge inverter composed mainly of four full-bridge connected switching elements Q21 through Q24. These switching elements Q21 through Q24 are controlled in the ON/OFF state by switching control signals supplied from the inverter control section 250. In response to the fact that the pair of switching elements Q21, Q24 and the pair of switching elements Q22, Q23 alternately become in the ON state, the discharge lamp 500 connected to each of two bridge midpoints 242, 244 is supplied with the alternating pulse current with the polarity switched alternately. The inverter control section 250 controls the ON/OFF state of the switching elements Q21 through Q24 based on the control signal from the power feeding condition setting section 812 and the filter identification signal supplied from the color wheel control section 314. It should be noted that the switching of the polarity of the alternating pulse current will be described later.

A2. Modulation of Duty Ratio

Figure 4:
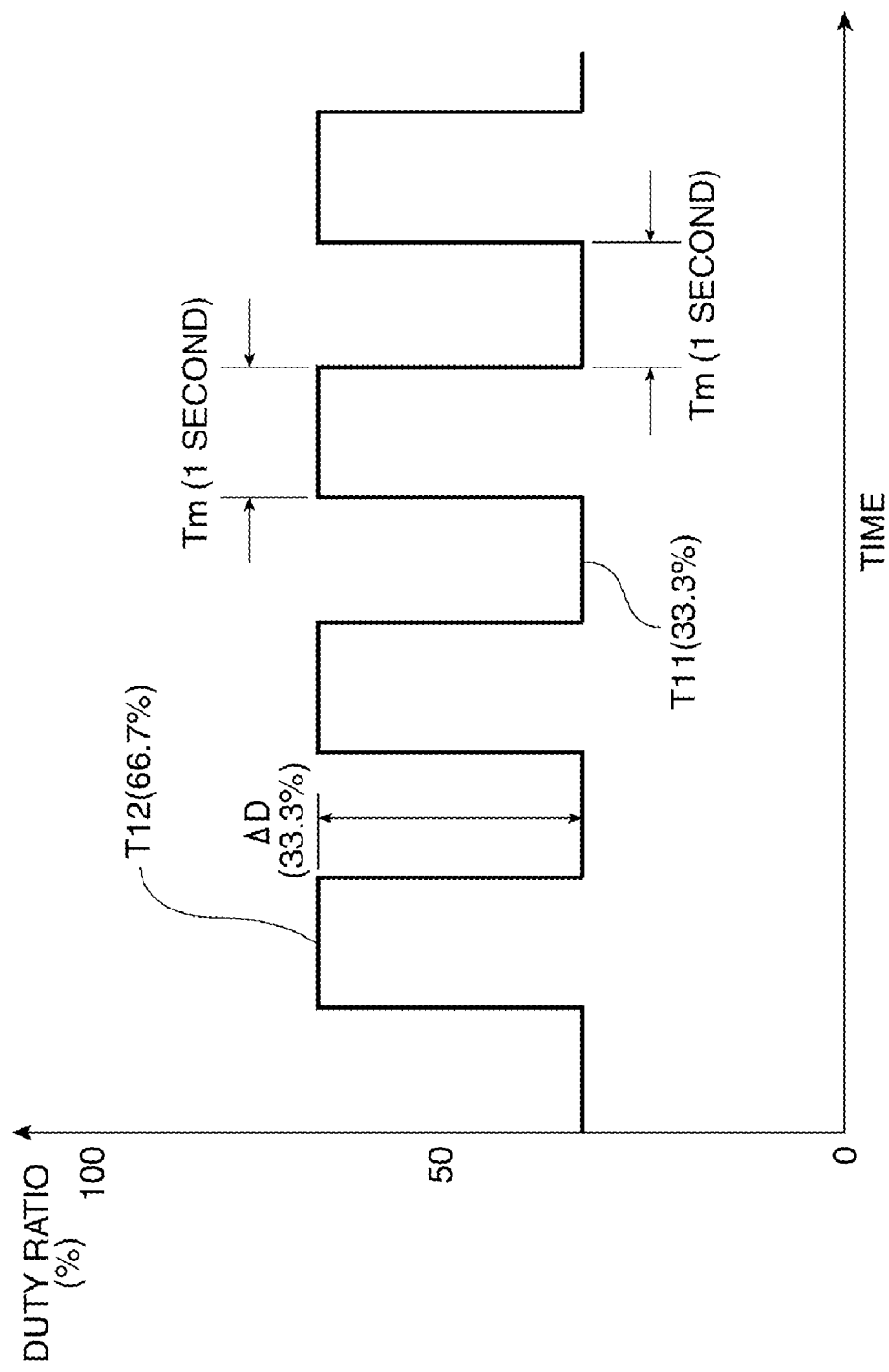
FIG. 4 is an explanatory diagram showing an example of a duty ratio modulation pattern according to the first embodiment.

FIG. 4 is an explanatory diagram showing an example of a duty ratio modulation pattern according to the first embodiment. In FIG. 4, the lateral axis represents time, and the vertical axis represents the duty ratio. It should be noted that hereinafter the value of the current (the lamp current) flowing through the discharge lamp 500 from the primary mirror side electrode 610 to the secondary mirror side electrode 710 is assumed to be a positive value, and the length of the period during which the current with a positive value flows with respect to the switching period of the polarity of the alternating pulse current is used as the duty ratio.

As shown in FIG. 4, the duty ratio is changed by a predetermined variation ΔD (about 33.3%) every predetermined time Tm (1 second in FIG. 4). In other words, in the modulation pattern of the first embodiment, there are alternately provided a period T11 with a length of Tm during which the duty ratio is retained at a low level (33.3%) and a period T12 with a length of Tm during which the duty ratio is retained at a high level (66.7%).

Figure 5:
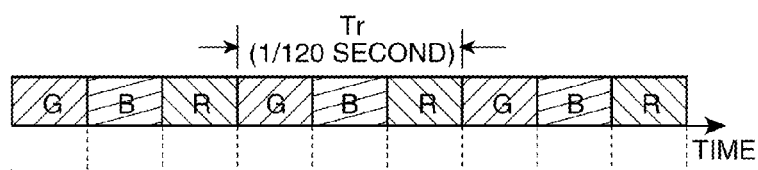
FIGS. 5A to 5D are explanatory diagrams showing a process of switching the polarity of a lamp current.
Figure 5:
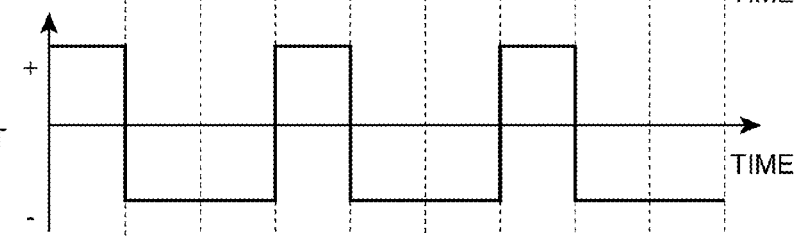
Figure 5:
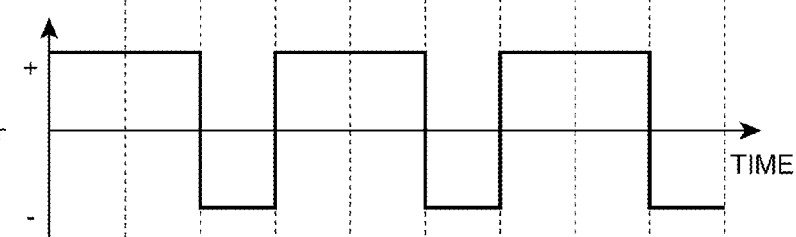
Figure 5:
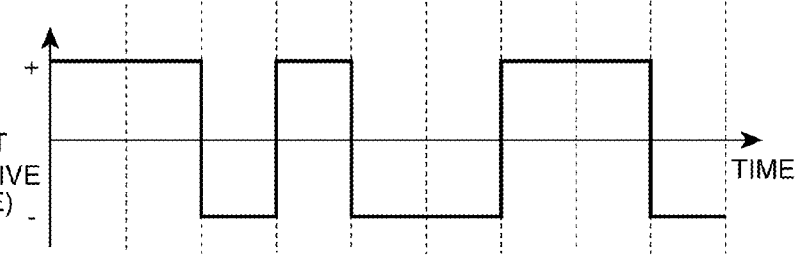

FIGS. 5A to 5D are explanatory diagrams showing a process of switching the polarity of the lamp current. FIG. 5A shows the filter located on the optical path OP (FIG. 1). FIGS. 5B and 5C show the time variation of the lamp current in each of the periods (retentive periods) T11, T12 during which the duty ratio is retained at a constant value as shown in FIG. 4. FIG. 5D shows the time variation of the lamp current in the case of providing no retentive period as a comparative example.

As shown in FIG. 5A, the filter located on the optical path OP is switched every rotational period Tr (1/120 second) corresponding to the rotational frequency (120 Hz) of the color wheel 312. In the color wheel 312 according to the first embodiment, it is arranged that the color filters of R, G, and B have the same widths. Therefore, each of the lengths of the time periods during which the respective filters are located on the optical path OP is a third of the rotational period Tr.

As shown in FIGS. 5A to 5D, the switching period of the lamp current is arranged to be the same as the rotational period Tr (1/120 second) of the color wheel 312. Therefore, the frequency of the lamp current is set to be 120 Hz, the same frequency as the rotational frequency of the color wheel 312.

As shown in FIG. 5B, in the retentive period T11 with the lower duty ratio, the polarity of the lamp current is set to be positive during the period during which the G filter is positioned on the optical path OP, and negative during the period during which the B filter or the R filter is located on the optical path OP. Therefore, the duty ratio in the retentive period T11 becomes approximately 33.3% (1/3) as shown in FIG. 4.

As shown in FIG. 5C, in the retentive period T12 with the higher duty ratio, the polarity of the lamp current is set to be positive during the period during which the G filter or the B filter is positioned on the optical path OP, and negative during the period during which the R filter is located on the optical path OP. Therefore, the duty ratio in the retentive period T12 becomes approximately 66.7% (2/3) as shown in FIG. 4.

On the other hand, in the comparative example shown in FIG. 5D, the state with the higher duty ratio and the state with the lower duty ratio are switched every rotational period Tr of the color wheel 312. Thus, the average value of the duty ratio is kept at 50%. This process is executed for preventing uneven consumption of the electrodes 610, 710 due to excessive temperature rise in one of the electrodes 610, 710 caused by driving the discharge lamp 500 while keeping the state with the higher duty ratio or the state with the lower duty ratio.

As shown in FIGS. 5A to 5D, in the first embodiment, the switching of the polarity of the lamp current is performed at the timing of a color change at which the filter located on the optical path OP is switched. As described above, by synchronizing the switching of the polarity of the lamp current with the color change, deterioration (degradation in illuminance or generation of a beat noise) in the image caused by the variation in the emitted light intensity due to the switching of the polarity can be prevented.

Figure 6:
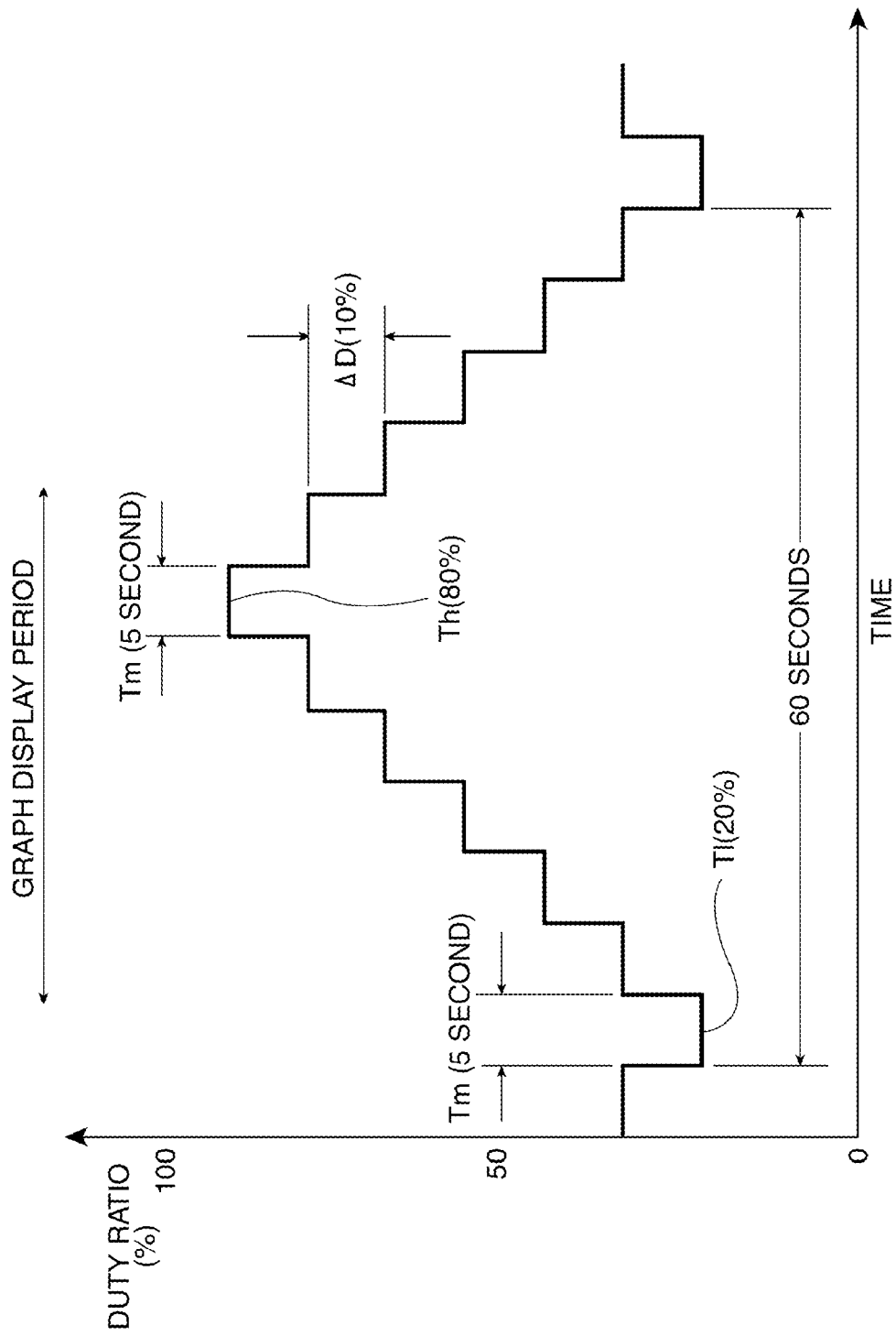
FIG. 6 is a diagram showing the duty ratio modulation pattern used for evaluation of the temperature variation.

A3. Evaluation Result of Electrode Temperature Variation Due to Duty Ratio Modulation In order for examining the influence on the temperature of the electrodes 610, 710 exerted by the modulation of the duty ratio, evaluation on how the electrodes 610, 710 change is executed while actually modulating the duty ratio. FIG. 6 shows the duty ratio modulation pattern used for the evaluation of the temperature variation.

In the modulation pattern used, the duty ratio is varied by 10% from 20% in the retentive period Tl with the lowest duty ratio to 80% in the retentive period Th with the highest duty ratio. The duty ratio is modulated with a period of 60 seconds, assuming that the retentive period in each duty ratio is 5 seconds.

Figure 7:
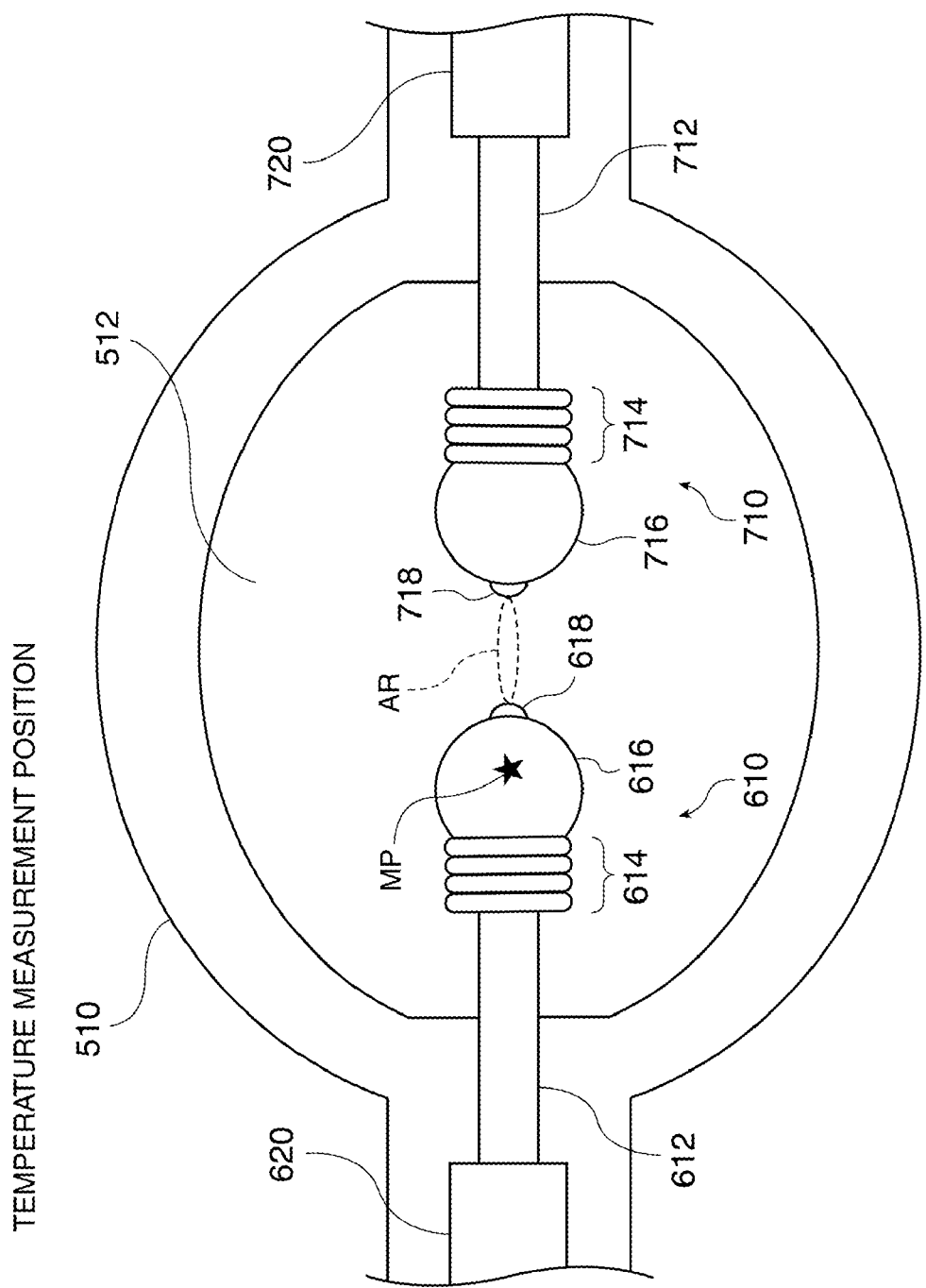
FIG. 7 is an explanatory diagram schematically showing a central portion of a discharge lamp 500 used for the evaluation.

FIG. 7 is an explanatory diagram schematically showing a central portion of a discharge lamp 500 used for the evaluation. As shown in FIG. 7, the electrode 610 has a core rod 612, a coil portion 614, a main body portion 616, and a projection 618. The electrode 610 is formed in a stage prior to the encapsulation into the discharge lamp main body 510 by winding a wire made of an electrode material (e.g., tungsten) around the core rod 612 to form the coil portion 614, and then heating to melt the coil portion 614 thus formed. Thus, the main body portion 616 with a large thermal capacity and the projection 618 forming a place where the arc AR occurs. The secondary mirror side electrode 710 is also formed similarly to the primary mirror side electrode 610.

The measurement of the temperature is performed at a measurement position MP provided with a star mark in the vicinity of a substantially central portion of the main body section 616 provided to the primary mirror side electrode 610. The temperature of the measurement point MP heated to have high temperature due to the occurrence of the arc AR is measured using a radiation thermometer.

FIGS. 8A and 8B are graphs showing the temperature variation of the primary mirror side electrode 610 due to the duty ratio modulation. The graph of FIG. 8A shows the temperature variation of the primary mirror side electrode 610 in the graph display period shown in FIG. 6. As shown in FIGS. 8A and 8B, the temperature of the primary mirror side electrode 610 rises as the duty ratio rises, namely as the period during which the primary mirror side electrode 610 acts as the anode becomes longer. This is because the kinetic energy of the electrons emitted from the cathode due to the arc AR is converted into heat energy upon collision of the electrons with the anode.

FIG. 8B is a graph showing the temperature variation of the primary mirror side electrode 610 before and after the retentive period with the duty ratio of 50%. As shown in FIG. 8B, in accordance with the duty ratio rising from 40% to 50%, the temperature of the primary mirror side electrode 610 rises approximately 40K. Further, in accordance with the duty ratio rising from 50% to 60%, the temperature of the primary mirror side electrode 610 rises approximately 25K.

Figure 9:
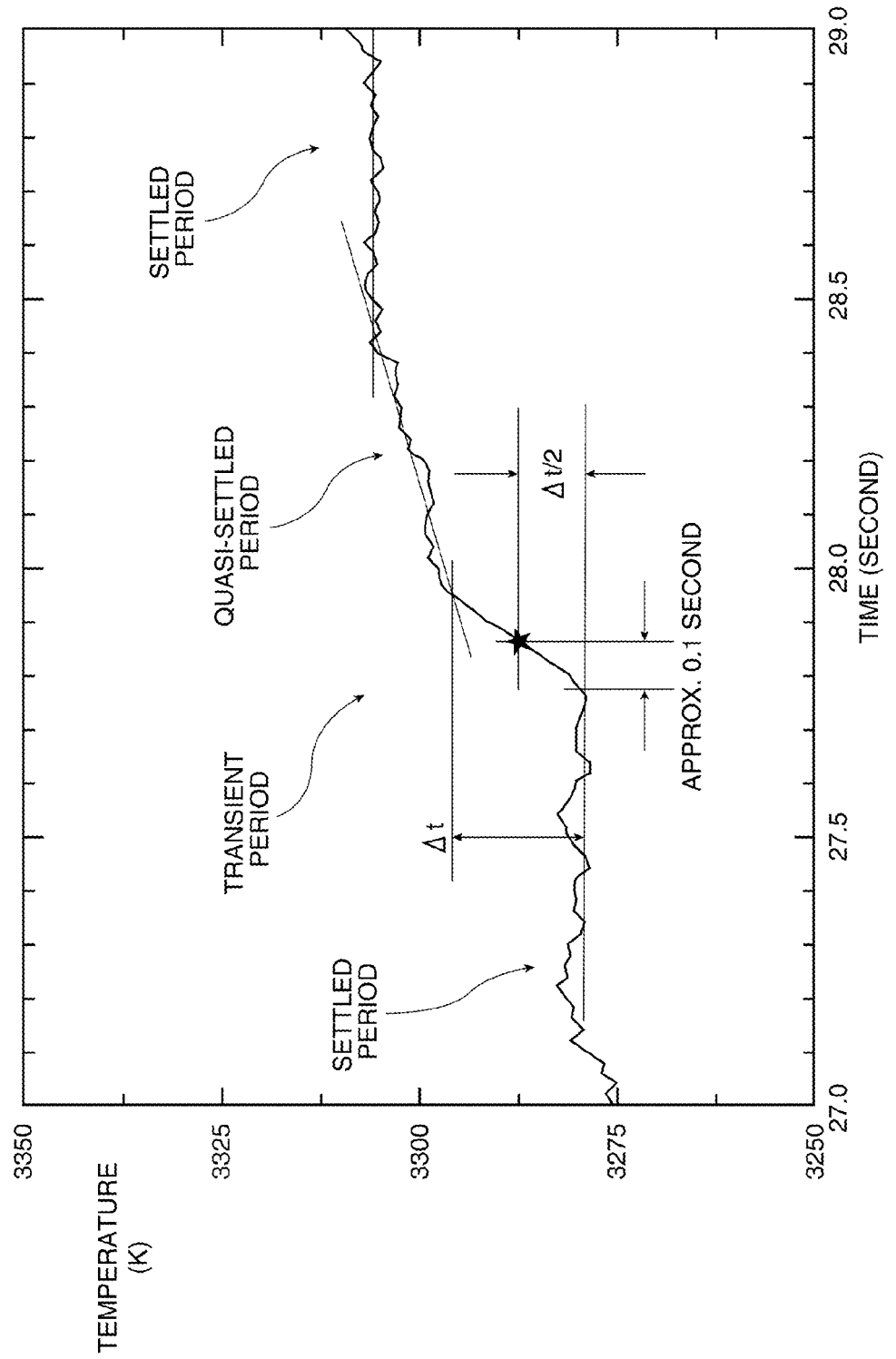
FIG. 9 is a graph showing a transient response of the electrode temperature upon a change in the duty ratio.

FIG. 9 is a graph showing a transient response of the electrode temperature upon a change in the duty ratio. FIG. 9 shows the temperature variation of the primary mirror side electrode 610 when the duty ratio is raised from 40% to 50%. As shown in FIG. 9, the temperature of the primary mirror side electrode 610 is settled after approximately 0.5 second has elapsed from the change in the duty ratio. Prior to the settled period, a quasi-settled period in which the temperature variation of the primary mirror side electrode 610 becomes gentle is observed. Assuming the rising amount Δt of the temperature in the transient period in which the temperature variation of the primary mirror side electrode 610 is large as the difference between the temperature in the settled period before the switching and the temperature at the beginning of the quasi-settled period after the switching, it is possible to sufficiently vary the temperature of the primary mirror side electrode 610 if there is time for generating the temperature difference corresponding to a half of the rising amount Δt.

According to the result described above, it turns out that the length of the retentive period is preferably set to be equal to or longer than 0.1 second, and is further preferably set to be equal to or longer than 0.5 second. It also turns out that in the comparative example shown in FIG. 5D, since the duty ratio is varied in a short period of time (1/120 second), the temperature of the electrodes 610, 710 is hardly varied, in contrast.

A4. Influence of Retentive Period

Figure 10:
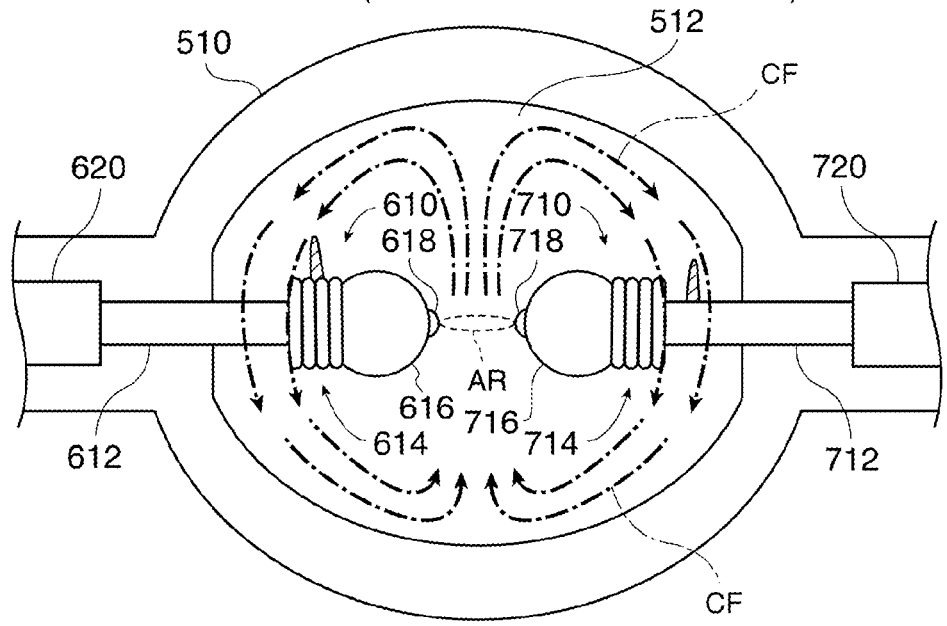
FIGS. 10A and 10B are explanatory diagrams schematically showing an influence exerted on the electrodes by the presence or absence of a retentive period of the duty ratio.
Figure 10:
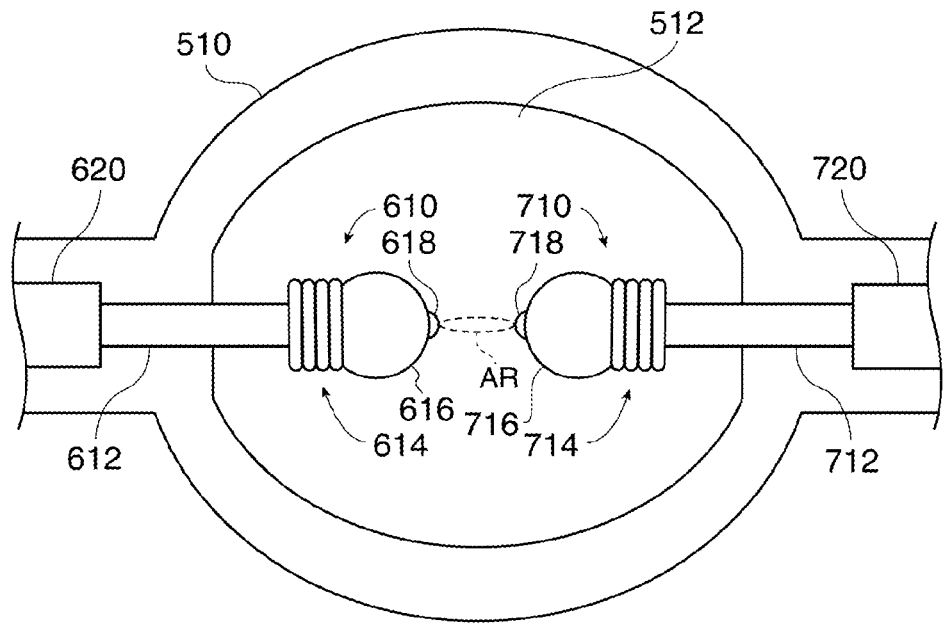

FIGS. 10A and 10B are explanatory diagrams schematically showing an influence exerted on the electrodes 610, 710 by the presence or absence of the retentive period of the duty ratio. FIG. 10A shows the central portion of the discharge lamp 500 in the case in which the retentive period of the duty ratio is not provided, namely when the polarity of the lamp current is switched as shown in FIG. 5D. FIG. 10B shows the central portion of the discharge lamp 500 when driving the discharge lamp 500 in a manner of the first embodiment provided with the retentive period of the duty ratio.

When lighting the discharge lamp 500, the gas encapsulated in the discharge space 512 is heated due to the generation of the arc AR, and convects inside the discharge space 512. In the case in which the retentive period is not provided as in the comparative example, the temperature distribution in each of the electrodes 610, 710 becomes stationary. Since the temperature distribution in each of the electrodes 610, 710 becomes stationary, stationary convection CF is caused inside the discharge space 512. The gas thus convecting includes the electrode material melted and evaporated by the arc AR. Therefore, when the stationary convection CF is caused, the electrode material is locally stacked on the core rods 612, 712 or the coil portions 614, 714 with the temperature lower than that of the electrode tip portion, as shown in FIG. 10A. Thus, the acicular crystals of the electrode material indicated by hatching grow on the core rods 612, 712 or the coil portions 614, 714.

If the acicular crystals grow as described above, an arc from the acicular crystals toward the inner wall of the discharge space 512 might occur in the case in which the temperature of the main body portion 616, 716 or the projection 618, 718 does not rise sufficiently, such as at the start-up of the lamp. If the arc from the acicular crystals toward the inner wall of the discharge space 512 occurs, the inner wall itself is deteriorated. Further, since silicon oxide ($SiO_2$) is scattered and decomposed upon the deterioration of the inner wall, the halogen cycle is disturbed, and thus the evaporation of the electrode material is promoted. As described above, in the case in which the retentive period of the duty ratio is not provided, since the growth of the acicular crystals causes the inner wall itself to be deteriorated, or failure in the halogen cycle to be caused to lose the shapes of the main body portions 616, 716 and the projections 618, 718 of the electrodes, the life of the discharge lamp 500 might be shortened.

In contrast, according to the first embodiment, by modulating the duty ratio, and at the same time providing the retentive period during which the duty ratio is retained at a constant value, the temperature distribution in each of the electrodes 610, 710 varies temporally. Therefore, as shown in FIG. 10B, the stationary convection CF inside the discharge space 512 can be prevented from occurring. Since the stationary convection CF is prevented from occurring, the local deposition of the electrode material and the growth of the acicular crystal due to the local deposition thereof can be prevented. It should be noted that in order for avoiding the formation of the stationary convection CF, it is more preferable to make the length of a predetermined time Tm equal to or shorter than one minute.

As described above, according to the first embodiment, the polarity of the lamp current is switched at the timing at which the filter located on the optical path is switched, namely the timing at which the color of the time-division colored light beam is changed. Therefore, the deterioration in the image caused by the variation in the emitted light intensity due to the switching of the polarity can be prevented. Further, by providing the retentive period during which the duty ratio is retained constant when performing the modulation of the duty ratio, the stationary convection CF can be prevented from occurring inside the discharge space 512. Therefore, it is possible to prevent the growth of the acicular crystal due to the stationary convection CF, and thus, shortening of the life of the discharge lamp 500 due to the growth of the acicular crystal can be prevented.

B. Second Embodiment

FIGS. 11A and 11B are explanatory diagrams showing an example of a duty ratio modulation pattern according to a second embodiment. The second embodiment is different from the first embodiment in that the modulation pattern is switched in accordance with the deterioration state of the discharge lamp 500. The other points are substantially the same as in the first embodiment.

In the second embodiment, the deterioration state of the discharge lamp 500 is detected based on the lamp voltage of the discharge lamp 500. Here, the lamp voltage denotes a voltage applied between the electrodes 610, 710 when driving the discharge lamp 500 with the rated power. The lamp voltage can be detected as, for example, a voltage between the two output terminals of the converter 220 (FIG. 2). The lamp voltage thus detected is obtained by the duty ratio modulation section 814 via the converter control section 230 and the input/output port 840. Based on the lamp voltage thus obtained, the duty ratio modulation section 814 modifies the modulation pattern of the duty ratio to be set to the power feeing condition setting section 812. As described above, the converter control section 230 is configured so as to be capable of acquiring the lamp voltage, and therefore, can also be called a "lamp voltage detection section."

It should be noted that it is also possible to detect the deterioration state of the discharge lamp 500 using other methods. For example, it is also possible to detect the deterioration state based on occurrence of the arc jump due to planarization of the main body portions 616, 716, or decrease in the light intensity due to blackening of the inside of the discharge space 512. In this case, the generation of the arc jump and the decrease in the light intensity can be detected using, for example, an optical sensor such as a photodiode disposed close to the discharge lamp 500.

In the second embodiment, in the case (a low lamp voltage mode) in which the lamp voltage is lower than a predetermined threshold value (90V in the example shown in FIGS. 11A and 11B), the modulation pattern with a smaller (approximately 16.7%) variation ΔD of the duty ratio at the moment when switching the retentive period is used, as shown in FIG. 11A. On the other hand, in the case (a high lamp voltage mode) in which the lamp voltage is equal to or higher than the predetermined threshold value, the modulation pattern with a larger (approximately 33.3%) variation ΔD is used, as shown in FIG. 11B.

In the low lamp voltage mode shown in FIG. 11A, the duty ratio is modulated in a range from approximately 16.7% in the retentive period T21 to approximately 83.3% in the retentive period T25. The length Tm of each of these retentive periods T21, T25, and other retentive periods (T22 through T24) each having the duty ratio taking an intermediate value is arranged to be 1 second. As described above, the duty ratio is varied in a stepwise manner with the variation ΔD of approximately 16.7%. Thus, in the low lamp voltage mode, the duty ratio is modulated with a period of 8 seconds. Since the modulation pattern in the high lamp voltage mode shown in FIG. 11B is the same as the modulation pattern in the first embodiment, the explanations therefor will be omitted here.

Figure 12:
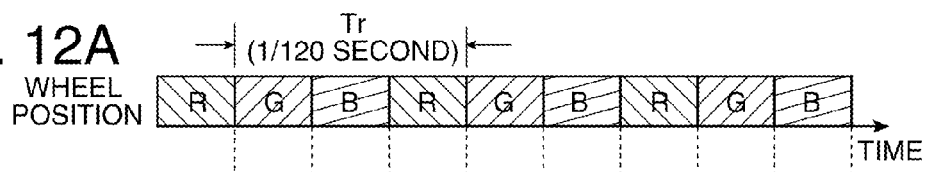
FIGS. 12A to 12F are explanatory diagrams showing a process of switching the polarity of the lamp current in a low lamp voltage mode.
Figure 12:
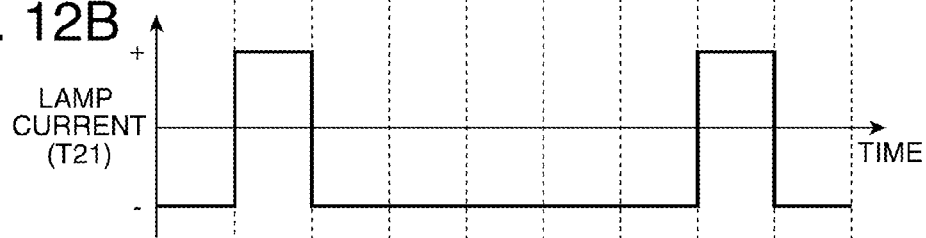
Figure 12:
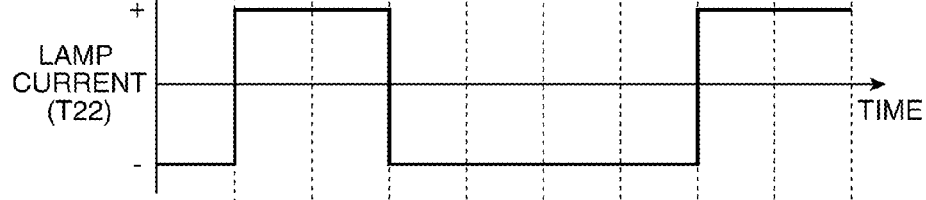
Figure 12:
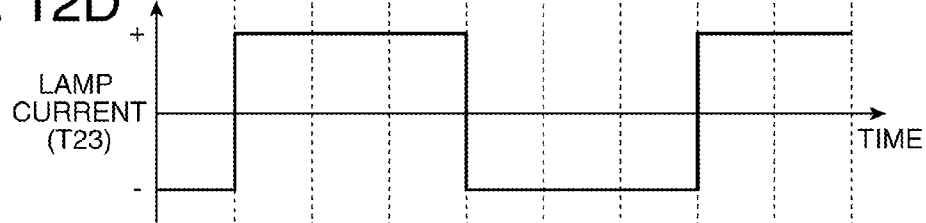
Figure 12:
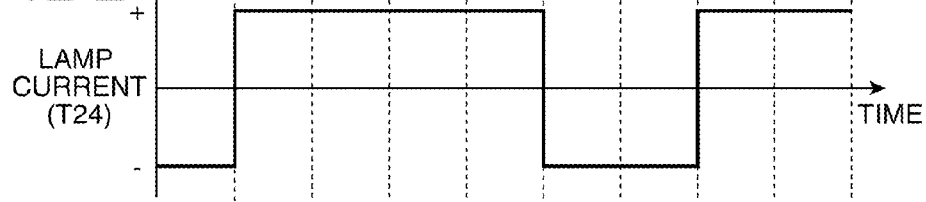
Figure 12:
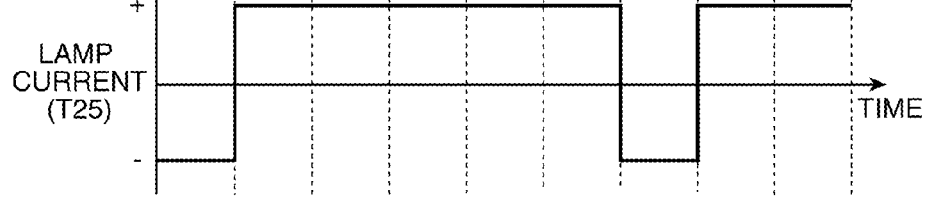

FIGS. 12A to 12F are explanatory diagrams showing a process of switching the polarity of the lamp current in the low lamp voltage mode. FIG. 12A shows the filter located on the optical path OP (FIG. 1). FIGS. 12B to 12F show the time variations in the lamp current in the retentive periods T21 through T25, respectively. It should be noted that the polarity switching of the lamp current in the high lamp voltage mode is the same as in the first embodiment shown in FIGS. 5A to 5D.

As shown in FIGS. 12A to 12F, the switching period of the lamp current is arranged to be twice as long as the rotational period Tr (1/120 second) of the color wheel 312 in the low lamp voltage mode. Therefore, the frequency of the lamp current becomes 60 Hz, which is a half of the rotational frequency (120 Hz) of the color wheel 312.

As shown in FIG. 12B, in the retentive period T21 with the lowest duty ratio, the polarity of the lamp current becomes positive in the period in which the G filter is located on the optical path OP, and becomes negative in the period in which the B filter or the R filter is located on the optical path OP, in the first one of the two rotational periods Tr of the color wheel 312. Further, the polarity of the lamp current is kept negative during the subsequent rotational period Tr. Therefore, the duty ratio in the retentive period T21 becomes approximately 16.7% (⅙) as shown in FIG. 11A.

As shown in FIG. 12C, in the retentive period T22, the polarity of the lamp current becomes positive in the period in which the G filter or the B filter is located on the optical path OP, and becomes negative in the period in which the R filter is located on the optical path OP, in the first one of the two rotational periods Tr of the color wheel 312. Further, the polarity of the lamp current is kept negative during the subsequent rotational period Tr. Therefore, the duty ratio in the retentive period T22 becomes approximately 33.3% (2/6=⅓) as shown in FIG. 11A.

As shown in FIG. 12D, in the retentive period T23, the polarity of the lamp current is kept positive during the first one of the two rotational periods Tr of the color wheel 312, and then kept negative during the subsequent rotational period Tr. Therefore, the duty ratio in the retentive period T23 becomes approximately 50% (3/6=½) as shown in FIG. 11A.

As shown in FIG. 12E, in the retentive period T24, the polarity of the lamp current is kept positive during the first one of the two rotational periods Tr of the color wheel 312. Then, in the subsequent rotational period Tr, the polarity of the lamp current becomes positive in the period in which the G filter is located on the optical path OP, and becomes negative in the period in which the B filter or the R filter is located on the optical path OP. Therefore, the duty ratio in the retentive period T24 becomes approximately 66.7% (4/6=⅔) as shown in FIG. 11A.

As shown in FIG. 12F, in the retentive period T25 with the highest duty ratio, the polarity of the lamp current is kept positive during the first one of the two rotational periods Tr of the color wheel 312. Then, in the subsequent rotational period Tr, the polarity of the lamp current becomes positive in the period in which the G filter or the B filter is located on the optical path OP, and becomes negative in the period in which the R filter is located on the optical path OP. Therefore, the duty ratio in the retentive period T25 becomes approximately 83.3% (⅚) as shown in FIG. 11A.

As described above, also in the second embodiment, the switching of the polarity of the lamp current is performed at the timing of a color change at which the filter located on the optical path OP is switched. Therefore, the deterioration in the image caused by the variation in the emitted light intensity due to the polarity switching of the lamp current can be prevented.

In the second embodiment, the variation ΔD of the duty ratio between the retentive periods is set to be smaller (approximately 16.7%) in the low lamp voltage mode, and the variation ΔD of the duty ratio between the retentive periods is set to be larger (approximately 33.3%) in the high lamp voltage mode. In general, the larger the variation ΔD of the duty ratio is, the more stably the shapes of the projections 618, 718 (FIG. 7) of the electrodes 610, 710 are maintained, and the longer period of time the arc can stably be generated for. On the other hand, the smaller the variation ΔD of the duty ratio is, the smaller the thermal shock applied to the discharge lamp 500 becomes. Therefore, by making the variation ΔD of the duty ratio smaller in the low lamp voltage mode in which the deterioration does not progress while making the variation ΔD of the duty ratio smaller in the high lamp voltage mode in which the deterioration progresses, it becomes possible to prevent damage in the discharge lamp 500 due to the thermal shock, and at the same time, to use the discharge lamp 500 with advanced deterioration for a longer period of time.

It should be noted that in the second embodiment, although the duty ratio is varied in a stepwise manner in a range from approximately 16.7% in the retentive period T21 to approximately 83.3% in the retentive period T25 in the low lamp voltage mode, the modulation pattern of the duty ratio is not necessarily limited thereto. For example, it is also possible to adopt the modulation pattern with a narrower modulation range in which the retentive period T21 and the retentive period T25 are eliminated.

Further, in the low lamp voltage mode, it is also possible to eliminate the retentive period T21 (with the duty ratio of approximately 16.7%), the retentive period T23 (with the duty ratio of approximately 50%), and the retentive period T25 (with the duty ratio of approximately 83.3%) from the modulation pattern. In this case, although the modulation pattern becomes the same as in the high lamp voltage mode, the polarity switching period (the frequency) of the lamp current becomes longer than in the high lamp voltage mode. In general, in the discharge lamp 500 with advanced deterioration, the flicker becomes apt to occur when driving the discharge lamp 500 at low frequency. In this case, the frequency of the lamp current becomes higher in the high lamp voltage mode, and thus it becomes possible to prevent the flicker from occurring.

Although in the second embodiment, the variation ΔD of the duty ratio is increased in the high lamp voltage mode by performing the polarity switching of the lamp current in the same manner as in the first embodiment, it is also possible to increase the variation ΔD of the duty ratio by eliminating the retentive period T21 (with the duty ratio of approximately 16.7%), the retentive period T23 (with the duty ratio of approximately 50%), and the retentive period T25 (with the duty ratio of approximately 83.3%) from the modulation pattern in the low lamp voltage mode. In this case, the polarity switching pattern of the lamp current and the polarity switching period (frequency) of the lamp current are arranged to be the same as in the low lamp voltage mode.

As is obvious from the explanations described above, in the second embodiment, it becomes possible to use the discharge lamp 500 for a longer period of time by modifying at least one of the polarity switching pattern of the lamp current, the polarity switching period of the lamp current, and the modulation pattern of the duty ratio in accordance with the deterioration state of the discharge lamp.

C. Third Embodiment

Figure 13:
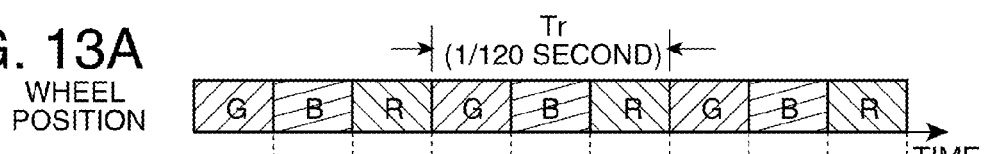
FIGS. 13A to 13C are explanatory diagrams showing a process of switching the polarity of the lamp current in a third embodiment.
Figure 13:
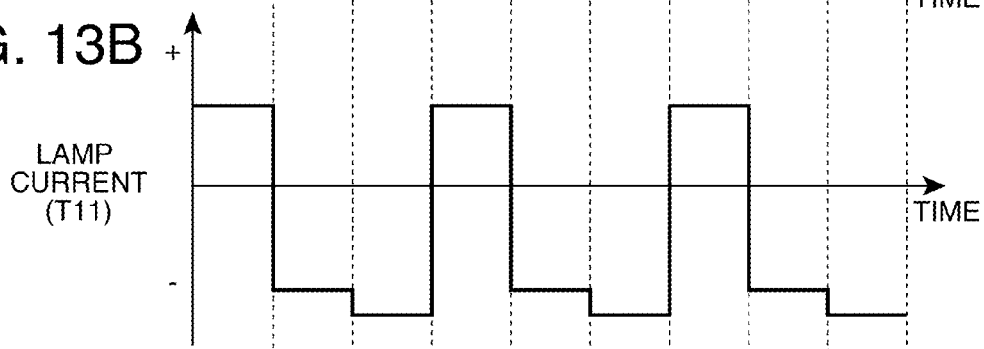
Figure 13:
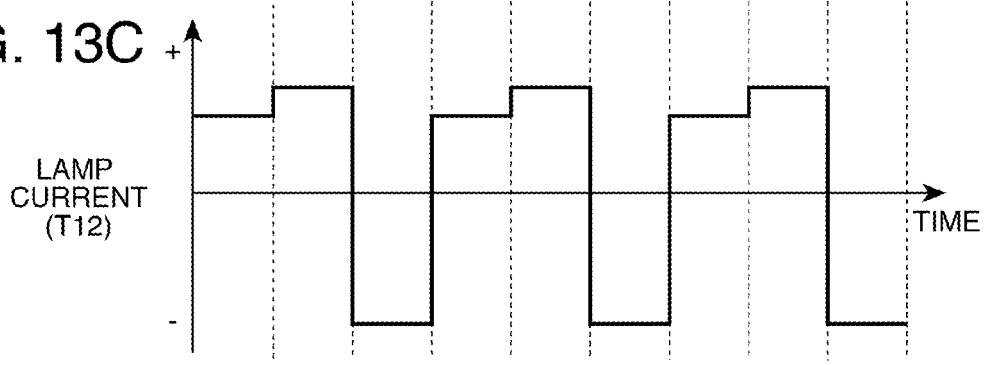
Figure 14:
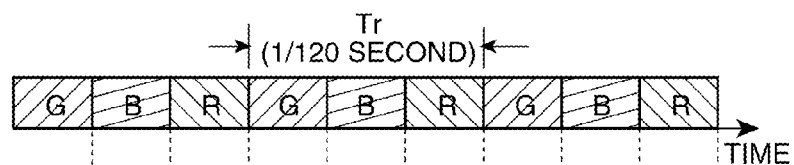
FIGS. 14A to 14D are diagrams showing a modified example of the lamp current polarity switching pattern.
Figure 14:
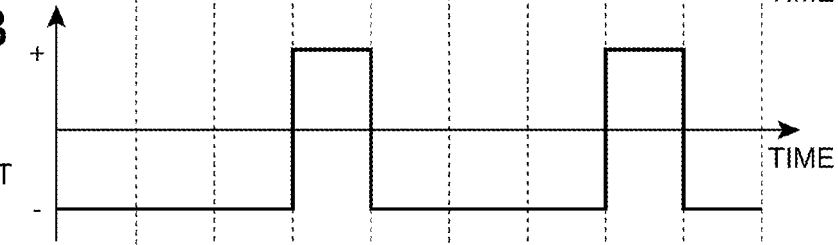
Figure 14:
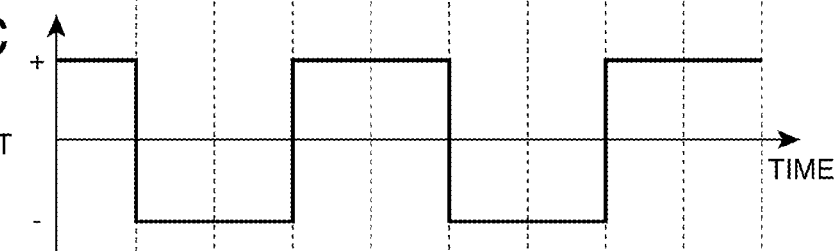
Figure 14:
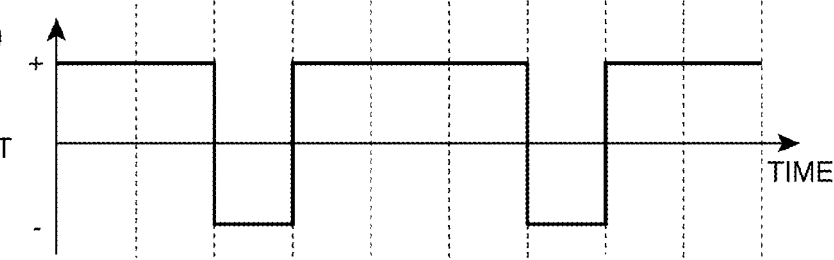

FIGS. 13A to 13C are explanatory diagrams showing a process of switching the polarity of the lamp current in a third embodiment. In the third embodiment, the absolute value of the lamp current is modified in accordance with the filter located on the optical path OP (FIG. 1). The other points are substantially the same as in the first embodiment. It should be noted that the lamp voltage is kept to a substantially constant value also in the case in which the absolute value of the lamp current is modified. Therefore, the modification of the absolute value of the lamp current corresponds to modification of the power value of the alternating pulse current to be supplied to the discharge lamp 500.

The modification of the absolute value of the lamp current corresponding to the filter (i.e., the color of the time-division colored light beam) located on the optical path OP can be performed by supplying the drive control section 210 or the converter control section 230 with the filter identification signal output by the color wheel control section 314 (FIG. 3). For example, in the case of supplying the drive control section 210 with the filter identification signal, the power feeding condition setting section 812 of the drive control section 210 modifies the power value, which is to be set to the converter control section 230, based on the filter identification signal obtained via the input/output port 840. Thus, the absolute value of the lamp current can be modified in accordance with the filter.

FIG. 13A shows the filter located on the optical path OP. FIGS. 13B and 13C show the time variation of the lamp current in each of the periods (retentive periods) T11, T12 during which the duty ratio is retained at a constant value, wherein the retentive period T11 has a lower duty ratio, and the retentive period T12 has a higher duty ratio.

As shown in FIGS. 13B and 13C, in the third embodiment, the absolute value of the lamp current is set to be the minimum in the period during with the G filter is located on the optical path OP. On the other hand, the absolute value of the lamp current is set to be the maximum in the period during which the R filter is located on the optical path OP. By modifying the absolute value of the lamp current in accordance with the filter located on the optical path OP in the manner as described above, the shift in the white balance caused by the fact that the light emitted from the discharge lamp 500 is not completely white can be controlled while keeping all of the widths of the R, G, and B filters in the color wheel 312 the same. Further, the white balance can more appropriately be set in accordance with the display content (screen display of a computer or projection of a television or a movie) in the projector 1000 (FIG. 1).

By making all of the widths of the R, G, and B filters the same as described above, the time periods during which the respective filters are located on the optical path OP become to have the same length (Tr/3). Therefore, it becomes possible to keep the variation ΔD of the duty ratio constant even in the case in which the polarity switching of the lamp current is performed at the timing of the color change at which the filter located on the optical path is switched, thus it becomes possible to more appropriately perform the modulation of the duty ratio.

It should be noted that although in the third embodiment, the absolute value of the lamp current is modified in the case of using a single modulation pattern, it is also possible to modify the absolute value of the lamp current in the case in which the duty ratio is modulated with the modulation patterns different from each other as in the case of the second embodiment.

D. MODIFIED EXAMPLES

It should be noted that the invention is not limited to the embodiments or the specific examples described above, but can be put into practice in various forms within the scope or the spirit of the invention, and the following modifications, for example, are also possible.

D1. Modified Example 1

Although in each of the embodiments described above, the polarity switching period of the lamp current is set to be the integral multiple of the rotational period Tr ($1/120$ second) of the color wheel 312, the polarity switching period of the lamp current is not necessarily limited thereto. For example, it is also possible to set the polarity switching period of the lamp current to be longer (4/3 Tr in the example shown in FIGS. 14A to 14D) than the rotational period Tr, as shown in FIGS. 14A to 14D. In the example shown in FIGS. 14A to 14D, the duty ratio is kept to either one of the three values of 25% in the period T41 shown in FIG. 14B, 50% in the period T42 shown in FIG. 14C, and 75% in the period T43 shown in FIG. 14D. It should be noted that it is more preferable to set the polarity switching period of the lamp current to be the integral multiple of the rotational period Tr of the color wheel 312 on the ground that setting of the duty ratio in each of the retentive periods becomes easier even in the case (i.e., in which the time interval between the color changes is not constant) in which the widths of the R, G, and B filters are different from each other.

D2. Modified Example 2

Although in each of the embodiments, there is used the color wheel 312 with the R, G, and B filters having the same width, it is also possible to use the color wheel of a different type. For example, it is also possible to modify the widths of the R, G, and B filters in accordance with the emission spectrum of the discharge lamp 500. In this case, it is possible to redress the white balance while keeping the absolute value of the lamp current constant. It should be noted that in the case in which the width is different between the filters, it is also possible to vary the duty ratio by reversing the polarity switching pattern of the lamp current within the polarity switching period.

D3. Modified Example 3

Although in each of the embodiments described above, the color wheel 312 is provided with the three filters of R, G, and B, it is also possible to arrange that the color wheel is provided with a white (W) filter and a yellow (Y) filter in addition to the R, G, and B filters. In this case, the polarity switching pattern of the lamp current and the modulation pattern of the duty ratio are modified accordingly.

D4. Modified Example 4

Although in each of the embodiments described above, the color wheel 312 is rotated to periodically switch the transmissive filter located on the optical path OP, thereby generating the time-division colored light beams with colors temporally different from each other, it is also possible to generate the time-division colored light beams without using the color wheel 312. It is also possible to generate the time-division colored light beams by rotating the color wheel provided with, for example, a plurality of dichroic mirrors for reflecting light beams with colors different from each other as reflective filters. Further, the time-division colored light beams can be generated by disposing a plurality of transmissive filters on the optical path, and opening and closing the shutter disposed on the discharge lamp 500 side or the illumination optical system 310 side of each of the transmissive filters. In this case, it is also possible to non-periodically vary the color of the time-division colored light beam.

D5. Modified Example 5

Although in each of the embodiments described above, the invention is applied to the projector 1000 (FIG. 1), the invention can also be applied to various image display apparatuses providing the image display apparatuses use the discharge lamp as the light source, and display a color image with the time-division colored light beams.

The entire disclosure of Japanese Patent Application No. 2008-321398, filed Dec. 17, 2008 is expressly incorporated by reference herein.

What is claimed is:

1. A light source device comprising:
  a discharge lamp provided with two electrodes;
  a discharge lamp lighting section adapted to light the discharge lamp by supplying the discharge lamp with electrical power while alternately switching a polarity of one of the electrodes of the discharge lamp with respect to the other of the electrodes; and
  a time-division color separation section adapted to receive light emitted from the discharge lamp in a lighted state and sequentially emit light beams with colors different from each other,
  wherein the discharge lamp lighting section switches the polarity in sync with a change in the color of the light beam emitted from the time-division color separation section, retains a duty ratio, which is a ratio of a positive polarity period with the polarity kept positive to a period of the polarity switching, at a constant value during a first retentive period, and retains the duty ratio at a different constant value from the duty ratio in the first retentive period during a second retentive period, thereby modulating the duty ratio.

2. The light source device according to claim 1, wherein the time-division color separation section periodically emits the light beams with the colors different from each other, and
  the period of the polarity switching is an integral multiple of a period of the change in the color.

3. The light source device according to claim 1, wherein a length of the period of the polarity switching is modified based on a deterioration state of the discharge lamp.

4. The light source device according to claim 1, wherein the discharge lamp lighting section modulates the duty ratio along a predetermined modulation pattern, and
  the modulation pattern is modified based on a deterioration state of the discharge lamp.

5. The light source device according to claim 3 further comprising:
  a lamp voltage detection section adapted to detect a lamp voltage, which is a voltage between the two electrodes upon supplying the discharge lamp with predetermined electrical power,
  wherein the deterioration state of the discharge lamp is determined based on the lamp voltage.

6. The light source device according to claim 1, wherein the discharge lamp lighting section sets electrical power to be supplied to the discharge lamp in accordance with the color of the light beam emitted form the time-division color separation section.

7. The light source device according to claim 1, wherein a time length of each of the first retentive period and the second retentive period is 0.1 second.

8. An image display apparatus comprising:
  a discharge lamp provided with two electrodes, and adapted to emit light for display;
  a discharge lamp lighting section adapted to light the discharge lamp by supplying the discharge lamp with electrical power while alternately switching a polarity of one of the electrodes of the discharge lamp with respect to the other of the electrodes; and
  a time-division color separation section adapted to receive light emitted from the discharge lamp in a lighted state and sequentially emit light beams with colors different from each other,
  wherein the discharge lamp lighting section switches the polarity in sync with a change in the color of the light beam emitted from the time-division color separation section, retains a duty ratio, which is a ratio of a positive polarity period with the polarity kept positive to a period of the polarity switching, at a constant value during a first retentive period, and retains the duty ratio at a different constant value from the duty ratio in the first retentive period during a second retentive period, thereby modulating the duty ratio.

9. The image display apparatus according to claim 8, wherein
  the time-division color separation section periodically emits the light beams with the colors different from each other, and
  the period of the polarity switching is an integral multiple of a period of the change in the color.

10. The image display apparatus according to claim 8, wherein
  a length of the period of the polarity switching is modified based on a deterioration state of the discharge lamp.

11. The image display apparatus according to claim 8, wherein
  the discharge lamp lighting section modulates the duty ratio along a predetermined modulation pattern, and
  the modulation pattern is modified based on a deterioration state of the discharge lamp.

12. The image display apparatus according to claim 10 further comprising:
  a lamp voltage detection section adapted to detect a lamp voltage, which is a voltage between the two electrodes upon supplying the discharge lamp with predetermined electrical power,
  wherein the deterioration state of the discharge lamp is determined based on the lamp voltage.

13. The image display apparatus according to claim 8, wherein the discharge lamp lighting section sets electrical power to be supplied to the discharge lamp in accordance with the color of the light beam emitted form the time-division color separation section.

14. The image display apparatus according to claim 8, wherein a time length of each of the first retentive period and the second retentive period is 0.1 second.

15. A method of sequentially generating time-division color-separated light beams with colors different from each other, comprising:

providing a discharge lamp having two electrodes;

sequentially generating light beams with colors different from each other while receiving light emitted from the discharge lamp lighted by supplying the discharge lamp with electrical power;

alternately switching a polarity of one of the electrodes of the discharge lamp to the other of the electrodes in sync with a change in the color of the light beam generated, upon supplying the discharge lamp with the electrical power;

retaining a duty ratio, which is a ratio of a positive polarity period with the polarity kept positive to a period of the polarity switching, at a constant value during a first retentive period, and retaining the duty ratio at a different constant value from the duty ratio in the first retentive period during a second retentive period.

* * * * *